United States Patent
Ishikawa

(10) Patent No.: US 7,675,547 B2
(45) Date of Patent: Mar. 9, 2010

(54) IMAGE PICKUP APPARATUS

(75) Inventor: Yoshikazu Ishikawa, Kawasaki (JP)

(73) Assignee: Canon Kabushiki Kaisha (JP)

( * ) Notice: Subject to any disclaimer, the term of this patent is extended or adjusted under 35 U.S.C. 154(b) by 451 days.

(21) Appl. No.: 11/676,286

(22) Filed: Feb. 17, 2007

(65) Prior Publication Data

US 2007/0196086 A1    Aug. 23, 2007

(30) Foreign Application Priority Data

Feb. 20, 2006    (JP) ................. 2006-042930

(51) Int. Cl.
*H04N 5/228* (2006.01)
(52) U.S. Cl. ................. 348/208.6; 348/208.3
(58) Field of Classification Search .............. 348/208.5, 348/208.8, 208.99, 208.1, 208.3, 208.6; 369/53.3; 396/55

See application file for complete search history.

(56) References Cited

U.S. PATENT DOCUMENTS

| | | | | |
|---|---|---|---|---|
| 5,210,563 A | * | 5/1993 | Hamada et al. | ............... 396/53 |
| 6,233,009 B1 | * | 5/2001 | Morofuji et al. | ......... 348/208.8 |
| 2002/0047906 A1 | * | 4/2002 | Ohta | ......................... 348/208 |
| 2005/0031326 A1 | * | 2/2005 | Yamazaki | .................... 396/55 |
| 2007/0030768 A1 | * | 2/2007 | Semba et al. | ................. 369/43 |

FOREIGN PATENT DOCUMENTS

| | | |
|---|---|---|
| JP | 02-173625 A | 7/1990 |
| JP | 2000-284337 A | 10/2000 |

* cited by examiner

*Primary Examiner*—Tuan Ho
(74) *Attorney, Agent, or Firm*—Rossi, Kimms & McDowell LLP

(57) ABSTRACT

An image pickup apparatus which is capable of enhancing the accuracy of shake correction. A shake-detecting sensor detects a shake of an apparatus body. A microcomputer computes a shake amount based on an output from the shake-detecting sensor. A camera signal processing circuit corrects motion of an image due to camera shake based on an output from the microcomputer. A rest-determining device determines, based on the output from the shake-detecting sensor, whether or not the apparatus body is at rest. A recorder records a picked-up image. A recorder vibration-determining device determines whether or not the apparatus body is vibrating due to vibration of the recorder. A cutoff frequency-setting device changes characteristics of the microcomputer based on a result of determination by the rest-determining device and a result of determination by the recorder vibration-determining device.

9 Claims, 10 Drawing Sheets

IMAGE PICKUP APPARATUS

BACKGROUND OF THE INVENTION

1. Field of the Invention

The present invention relates to an image pickup apparatus, and more particularly to an image pickup apparatus, such as a video camera equipped with a camera shake correction function.

2. Description of the Related Art

In the case where an image pickup apparatus equipped with the camera shake correction function is mounted on a tripod for shooting, a shake detection signal from a shake-detecting means becomes smaller. Conventionally, in view of this, there has been proposed a technique of changing the amplification factor and resolution of the shake detection signal when it is detected that an image pickup apparatus is mounted on a tripod, to thereby make it possible to correct even a minute shake with accuracy (see Japanese Laid-Open Patent Publication (Kokai) No. 2000-284337).

Further, in order to obtain a sufficient shake correction effect, there has been proposed a technique of changing the correction frequency band of the shake detection signal when it is detected that the image pickup apparatus is mounted on a tripod (see Japanese Laid-Open Patent Publication (Kokai) No. H02-173625).

However, although the above-mentioned conventional techniques propose accurate shake correction which is to be performed, when it is detected that the body of the image pickup apparatus is mounted on a tripod, by increasing the amplification factor of the shake detection signal, or expanding the correction frequency band to a lower frequency so as to change the characteristics of shake correction control.

Recently, a recorder provided in an image pickup apparatus has come to use a recording medium, such as a DVD (Digital Versatile Disk) or a hard disk. This type of recorder generates larger driving vibration during recording than a conventionally used tape-based recorder. For this reason, when shooting is performed with the image pickup apparatus body fixedly mounted on the tripod, the apparatus body can be vibrated by the driving vibration of the recorder incorporated therein.

For example, when the rotational vibration frequency of a DVD drive for double-speed writing is about 28 to 46 Hz, the driving vibration of the DVD drive and a frequency band (1 to 20 Hz) for shake correction are close to each other.

In the apparatus body, the driving vibration propagates through a lens unit, a mechanism of the recorder, a gyro sensor, and so forth at respective different frequencies and amplitudes, so that when the above-mentioned conventional methods are applied, the gyro sensor can erroneously detect rotational vibration caused during recording operation of the DVD drive, as a camera shake.

As a consequence, in spite of the body of the image pickup apparatus being actually at rest, an optical or electronic shake-correcting means carries out a shake correcting operation, which causes fluctuation or oscillation of an output image. As described above, the conventional image pickup apparatuses are not capable of performing proper shake correction, and suffers from low accuracy of shake correction.

SUMMARY OF THE INVENTION

It is an object of the present invention to provide an image pickup apparatus which is capable of enhancing the accuracy of shake correction.

To attain the above object, in a first aspect of the present invention, there is provided an image pickup apparatus comprising a shake-detecting device that detects a shake of an apparatus body, a computation device that computes a shake amount based on an output from the shake-detecting device, a correction device that corrects motion of an image due to camera shake based on an output from the computation device, a rest-determining device that determines, based on the output from the shake-detecting device, whether or not the apparatus body is at rest, a recorder that records a picked-up image, a recorder vibration-determining device that determines whether or not the apparatus body is vibrating due to vibration of the recorder, and a characteristic-changing device that changes characteristics of the computation device based on a result of determination by the rest-determining device and a result of determination by the recorder vibration-determining device.

With the arrangement of the image pickup apparatus according to the first aspect of the present invention, the characteristics of the computation device that computes the amount of shake of the apparatus body are changed based on the result of determination as to whether the apparatus body is at rest and the result of determination as to whether the apparatus body is vibrating due to vibration of the recorder. This makes it possible to change the characteristics of the computation device depending on whether or not the apparatus body is at rest and whether or not the recorder is being driven, i.e. according to the use state of the image pickup apparatus and the internal driven state of the same. As a consequence, in the case where the apparatus body is fixedly mounted on a tripod or the like, so that it is determined that the apparatus body is at rest, and when it is determined, based on the vibration frequency of the rotation of the recorder, that the mechanical drive of the recorder is in operation, i.e. the recorder is mechanically driven, image deflection caused by vibration of the apparatus body due to driving vibration of the recorder can be corrected to reduce the amount of deflection or shake of a picked-up image. Thus, the accuracy of shake correction can be enhanced.

To attain the above object, in a second aspect of the present invention, there is provided an image pickup apparatus comprising a shake-detecting device that detects a shake of an apparatus body, a computation device that computes a shake amount based on an output from the shake-detecting device, a switching device that selectively outputs one of an output from the computation device and a central correction value, a correction device that corrects motion of an image due to camera shake based on an output from the switching device, a rest-determining device that determines, based on the output from the shake-detecting device, whether or not the apparatus body is at rest, a zoom lens that varies a focal length, a zoom position-detecting device that detects a position of the zoom lens, a focal length-determining device that determines the focal length based on an output from the zoom position-detecting device, a recorder that records a picked-up image, a recorder vibration-determining device that determines whether or not the apparatus body is vibrating due to vibration of the recorder, and a correction control device that changes characteristics of the computation device and switches the output from the switching device, based on a result of determination by the rest-determining device, a result of determination by the recorder vibration-determining device, and a result of determination by the focal length-determining device.

With the arrangement of the image pickup apparatus according to the second aspect of the present invention, the characteristics of the computation device that computes the amount of shake of the apparatus body are changed based on the result of determination as to whether the apparatus body is at rest, the result of determination as to whether the apparatus body is vibrating due to vibration of the recorder, and the result of determination as to the focal length. This makes it possible to change the characteristics of the computation device depending on whether or not the apparatus body is at rest, whether or not the recorder is being driven, and the focal length, i.e. according to the use state of the image pickup apparatus and the states of internal component elements of the same. As a consequence, in the case where the apparatus body is fixedly mounted on a tripod or the like, so that it is determined that the apparatus body is at rest, and it is determined, based on the vibration frequency of the rotation of the recorder, that the mechanical drive of the recorder is being driven, and also determined that the focal length is not smaller than a predetermined value, image deflection or shake caused by vibration of the apparatus body due to driving vibration of the recorder can be corrected, even during shooting at a focal length closer to the telephoto end, so as to reduce the amount of deflection or shake of a picked-up image. On the other hand, when the apparatus body is at rest and when the focal length is smaller than the predetermined value, or when the apparatus body is at rest and when the mechanical drive of the recorder is in stoppage, it is possible to suppress degradation of the resolution of an image by fixedly setting the shake correcting position to a central shake correction value. This makes it possible to enhance the accuracy of shake correction. Further, it is possible to solve the problem of increased complexities of mechanisms and exterior design of the video camera without impairing the degree of freedom of designing the frame structure of the video camera and the exterior of the same, as well as to reduce the size and weight of the video camera.

Preferably, the shake-detecting device outputs a shake signal corresponding to the shake amount of the apparatus body, and the rest-determining device comprises a band-limiting device that performs band limitation on the shake signal from the shake-detecting device, and a frequency-detecting device that detects a frequency of the shake based on an output from the band-limiting device, and determines, based on an output from the frequency-detecting device, whether or not the apparatus body is at rest.

Preferably, the correction device comprises an image pickup element having an imaging area larger than an image size of a picked-up image to be output, and selects an image read range from an entire range of pixels of the image pickup element.

Preferably, the correction device optically deflects an optical axis to thereby correct motion of an image on an imaging area.

Preferably, the rest-determining device determines, based on an output signal obtained from the shake-detecting device and a control repetition period different from a control repetition period of the computation device, whether or not the apparatus body is at rest.

Preferably, the recorder vibration-determining device determines, based on an output signal obtained from the shake-detecting device and a control repetition period different from a control repetition period of the computation device, whether or not the apparatus body is vibrating.

The above and other objects, features, and advantages of the invention will become more apparent from the following detailed description taken in conjunction with the accompanying drawings.

DETAILED DESCRIPTION OF THE PREFERRED EMBODIMENTS

The present invention will now be described in detail with reference to the drawings showing preferred embodiments thereof.

First, a description will be given of an image pickup apparatus according to a first embodiment of the present invention.

Figure 1:
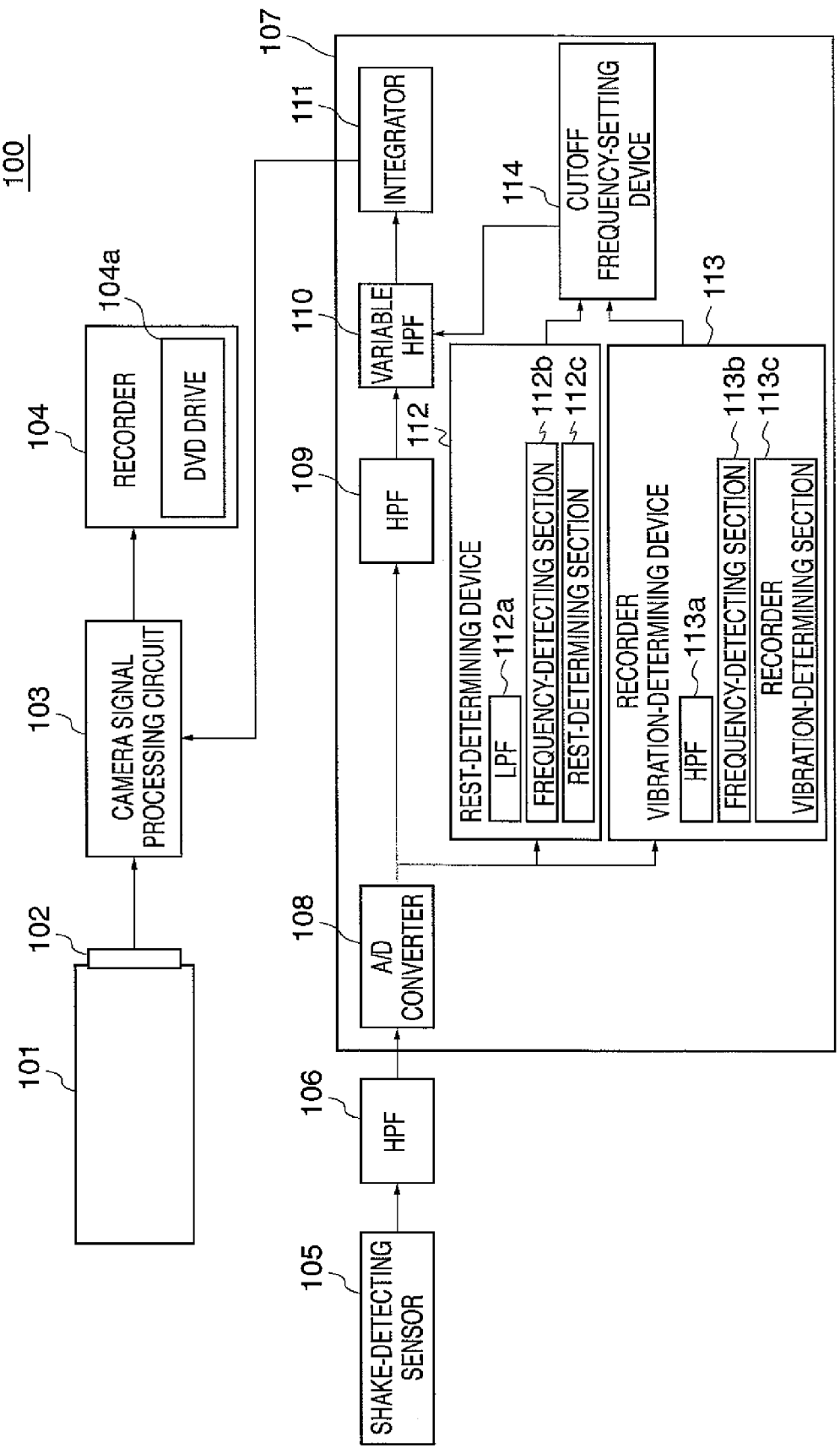
FIG. 1 is a schematic block diagram of a video camera as an image pickup apparatus according to a first embodiment of the present invention.

FIG. 1 is a schematic block diagram of a video camera 100 as the image pickup apparatus according to the first embodiment.

Referring to FIG. 1, reference numeral 101 designates a lens unit for photographing an object, 102 a CCD that photoelectrically converts an object image formed by the lens unit 101, and 103 a camera signal processing circuit that performs predetermined processing on a signal obtained by the CCD 102 to generate a recordable video signal. Further, reference numeral 104 designates a recorder that records the video signal generated by the camera signal processing circuit 103. The recorder 104 includes a DVD drive 104a. Reference numeral 105 designates a shake-detecting sensor for detecting a shake of the body of the video camera 100. In the present embodiment, the shake-detecting sensor 105 is implemented by an angular velocity sensor. Reference numeral 106 designates a high pass filter (hereinafter referred to as "the HPF") that eliminates DC components from the output signal (the angular velocity signal) output from the shake-detecting sensor 105, and 107 a system control microcomputer (hereinafter simply referred to as "the microcomputer") that delivers a shake correction signal to the camera signal processing circuit 103.

Next, a description will be given of the arrangement of the microcomputer 107.

In FIG. 1, reference numeral 108 designates an A/D converter that converts an analog signal output from the HPF 106 into a digital signal, and 109 an HPF that eliminates DC components generated by processing in the A/D converter 108. Further, reference numeral 110 designates a variable HPF that limits the passband of the signal from which the DC components have been removed by the variable HPF 110 (i.e. varies the cutoff frequency), and 111 an integrator that performs integration processing on an output from the variable HPF 110. The angular velocity signal is converted into an angular displacement signal by the integrator 111.

Further, in FIG. 1, reference numeral 112 designates a rest-determining device that detects a camera shake frequency after extracting a camera shake frequency band from an output from the A/D converter 108, to thereby determine whether the apparatus body is at rest. The rest-determining device 112 is comprised of an LPF 112a that extracts the camera shake frequency band, a frequency-detecting section 112b that detects the shake frequency, and a rest-determining section 112c that determines whether the apparatus body is at rest. Reference numeral 113 designates a recorder vibration-determining device that detects a vibration frequency after extracting a frequency band of vibration of the recorder 104 (a vibration frequency band) from the output from the A/D converter 108, to thereby determine whether or not the recorder 104 is vibrating. The recorder vibration-determining device 113 is comprised of an HPF 113a that extracts the vibration frequency band, a frequency-detecting section 113b that detects the vibration frequency, and a recorder vibration-determining section 113c that determines whether or not the recorder 104 is vibrating. Reference numeral 114 designates a cutoff frequency-setting device that sets the cutoff frequency of the variable HPF 110 based on a result of the determination by the rest-determining device 112 and a result of the determination by the recorder vibration-determining device 113.

The video camera 100 according to the present embodiment is provided with a shake correction function for performing shake corrections in at least two directions, i.e. vertical and horizontal directions. In the following description, however, description will be given of correction control and an operation performed in only one of the two directions for purposes of ease of understanding.

Next, the operation of the video camera 100 will be described with reference to FIG. 1.

In the video camera 100, incident light having passed through the lens unit 101 forms an optical image on an imaging area of the CCD 102, and then the optical image is subjected to photoelectrical conversion by the CCD 102. The camera signal processing circuit 103 performs analog-to-digital conversion of the output from the CCD 102, and carries out predetermined signal processing, such as gamma correction and white balance correction, on the A/D converted signal, followed by outputting the processed signal as a standardized video signal. Further, the camera signal processing circuit 103 performs electronic shake correction. Specifically, the camera signal processing circuit 103 captures the output from the CCD 102 into a memory (not shown) of the HPF 109. Then, the camera signal processing circuit 103 carries out processing for horizontally or vertically shifting an area with fewer pixels than the image pickup pixels of the picked-up image captured into the above-mentioned memory, which is cut out from the entire area of the image pickup pixels, based on the shake correction signal output from the microcomputer 107. Then, a video signal extracted using the cut-out area shifted based on the shake correction signal is output. The video signal output from the camera signal processing circuit 103 is delivered to the recorder 104 to be recorded on a DVD as a recording medium.

Next, a description will be given of a process for calculating the shake correction signal.

The angular velocity signal indicative of the amount of shake of the body of the video camera 100 detected by the shake-detecting sensor 105 implemented by the angular velocity sensor has DC components removed therefrom by the HPF 106. Then, the angular velocity signal is captured into the microcomputer 107 and processed therein.

In the following, a description will be given of processing which is executed by the microcomputer 107.

The angular velocity signal captured into the microcomputer 107 is converted into a digital signal by the A/D converter 108, and DC components of the digitized angular velocity signal are removed by the HPF 109. At the same time, the output from the A/D converter 108 is also supplied to the rest-determining device 112 and the recorder vibration-determining device 113. Processing executed by the rest-determining device 112 and the recorder vibration-determining device 113 will be described hereinafter.

Figure 6:
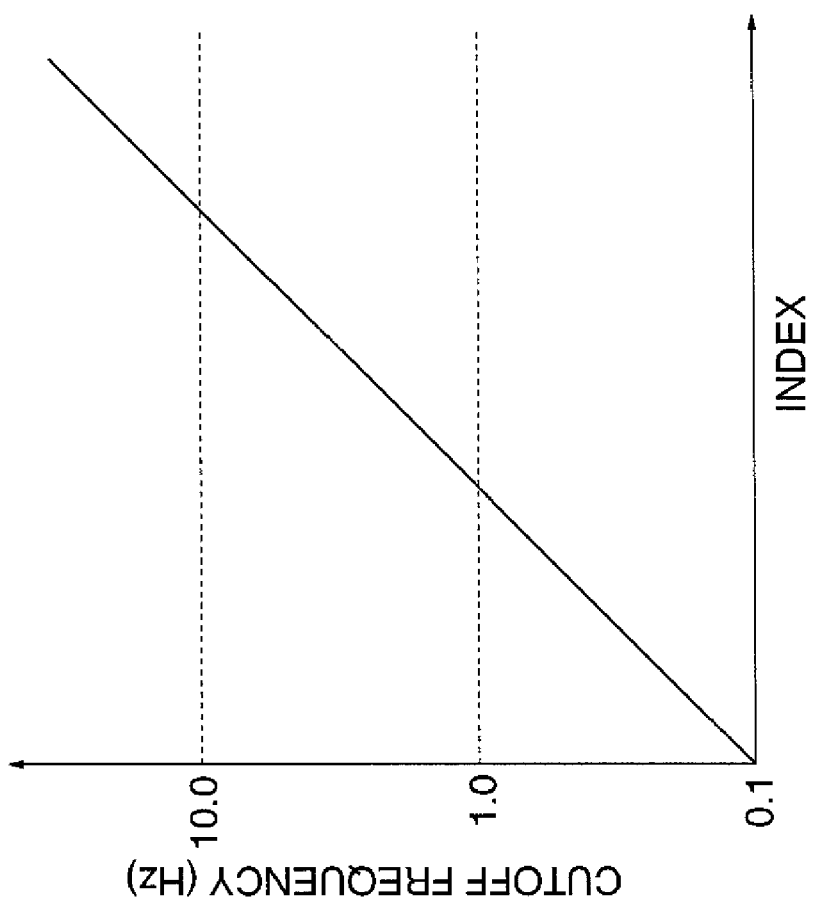
FIG. 6A is a diagram showing table data for use in setting a cutoff frequency corresponding to an index data value.
FIG. 6B is a diagram showing the relationship between the cutoff frequency and the index data shown in the table data in FIG. 6B.

The angular velocity signal having the DC components removed therefrom has its passband limited according to the cutoff frequency of the variable HPF 110, and then is output. The cutoff frequency of the variable HPF 110 is set by the cutoff frequency-setting device 114, described in detail hereinafter, based on a frequency, an amplitude, and so forth which can be calculated from the angular velocity signal. Specifically, an index data value corresponding to a desired cutoff frequency is calculated, and a cutoff frequency corresponding to the calculated index data value is set to a cutoff frequency for actual use. FIG. 6A is a diagram showing table data for use in setting the cutoff frequency corresponding to the index data value, and FIG. 6B is a diagram showing the relationship between the cutoff frequency and the index data shown in the table data in FIG. 6A. By determining an index data value shown in FIGS. 6A and 6B, the cutoff frequency of the variable HPF 110 is set to a frequency corresponding to the index data value. Thus, the variable HPF 110 extracts a signal component in a predetermined camera shake frequency band from the input angular velocity signal by filtering out components of the angular velocity signal in the set cutoff frequency band, and delivers the extracted signal component to the integrator 111 as a shake signal.

Then, the integrator 111 integrates the signal component in the predetermined camera shake frequency band extracted by the variable HPF 110, and delivers an angular displacement signal obtained by the integration, as a shake correction signal, to the camera signal processing circuit 103.

As described hereinbefore, the camera signal processing circuit 103 vertically or horizontally shifts the cut-out area in the entire area of the image pickup pixels of the picked-up image in the memory, not shown, based on the shake correction signal output from the integrator 111. This processing enables electronic correction of image deflection caused by a shake of the body of the video camera 100. Thus, camera shake correction is achieved by the video camera 100.

Although in the above description, the video camera 100 performs electronic camera shake correction by the camera signal processing circuit 103, the video camera 100 may perform optical camera shake correction. In this case, the lens unit 101 as a photographic optical system of the video camera 100 is provided with a shift lens that can be moved perpendicularly to an optical axis to deflect passing optical flux, and a driving device that moves the shift lens. With this arrangement, the driving device moves the shift lens based on the shake correction signal generated by the microcomputer 107 as described above, whereby optical correction of an image deflection caused by a shake of the body of the video camera 100 can be achieved.

Next, a description will be given of the operations of the rest-determining device 112 and the recorder vibration-determining device 113 to each of which is delivered the output from the A/D converter 108.

The rest-determining device 112 detects a frequency of a camera shake, which mainly occurs during shooting, and determines, based on the detected frequency, whether or not the video camera 100 is at rest. The angular velocity signal output from the shake-detecting sensor 105 includes a component generated by a shake of a photographer's hand in a frequency band corresponding thereto and a component generated by the rotational vibration of the recorder 104 in a frequency band corresponding thereto. For this reason, according to the present embodiment, the rest-determining device 112 separates the component in the frequency band corresponding to the camera shake from the angular velocity signal output from the shake-detecting sensor 105, and then detects a camera shake frequency to thereby determine whether or not the body of the video camera 100 is at rest.

The recorder vibration-determining device 113 detects a vibration frequency of the rotational vibration caused by the operation of the recorder 104, and determines, based on the detected frequency, whether or not the recorder 104 is being driven. Specifically, the recorder vibration-determining device 113 separates the component in the frequency band corresponding to the rotational vibration of the recorder 104 from the angular velocity signal output from the shake-detecting sensor 105, and then detects a rotational vibration frequency to thereby determine whether or not the recorder 104 incorporated in the video camera 100 is being driven.

Figure 2:
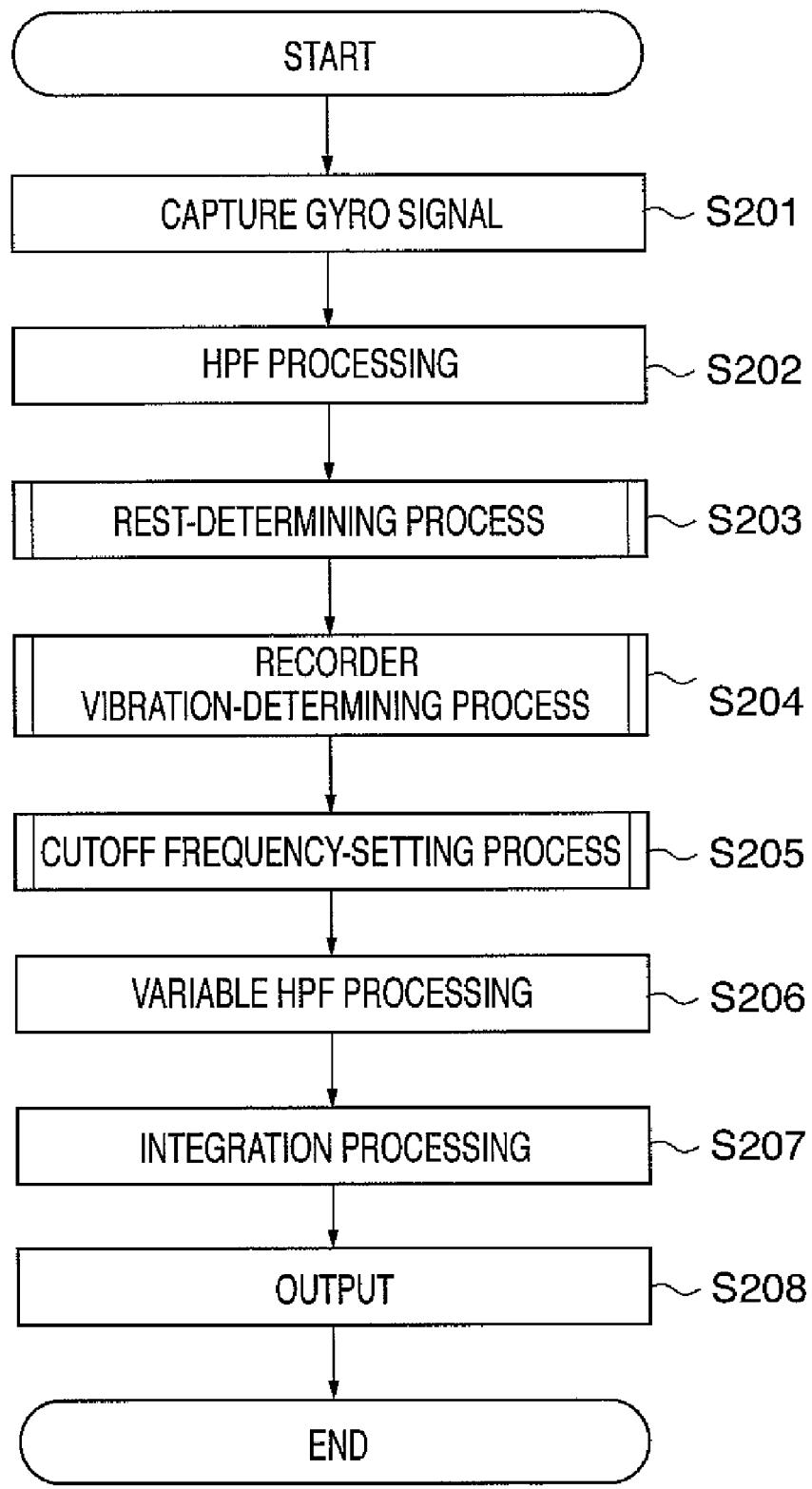
FIG. 2 is a flow diagram of a routine which is executed by a microcomputer appearing in FIG. 1.

Next, a description will be given of a routine which is executed by the microcomputer 107. FIG. 2 is a flow diagram of the routine.

In the present routine, first, the A/D conversion is carried out by the A/D converter 108 so as to convert the angular velocity signal (analog signal) input from the shake-detecting sensor 105 via the HPF 106 into a digital shake signal (step S201). Then, HPF processing is carried out by the HPF 109, whereby DC components generated by the A/D conversion are removed from the A/D converted shake signal (step S202).

Then, a rest-determining process is executed by the rest-determining device 112 so as to determine whether or not the body of the video camera 100 is at rest (step S203). The rest-determining process will be described in detail hereinafter. Then, a recorder vibration-determining process is executed by the recorder vibration-determining device 113 so as to determine whether or not the recorder 104 incorporated in the video camera 100 is being driven (step S204). The recorder vibration-determining process will be described in detail hereinafter.

Then, a cutoff frequency-setting process is executed by the cutoff frequency-setting device 114 so as to set the cutoff frequency of the variable HPF 110 based on a result of the determination in the rest-determining process in the step S203 and a result of the determination in the recorder vibration-determining process in the step S204 (step S205).

Thereafter, variable HPF processing is carried out by the variable HPF 110 so as to subject the shake signal output from the HPF 109 in the step S202 to predetermined frequency band limitation according to the cutoff frequency set in the cutoff frequency-setting process in the step S205 (step S206).

Then, integration processing is carried out by the integrator 111 so as to integrate the shake signal having undergone the frequency band limitation in the step S206, thereby calculating an angular displacement signal (step S207). The microcomputer 107 outputs the angular displacement signal calculated in the step S207, as a target shake correction value (shake correction signal), followed by terminating the present routine.

The target shake correction value output by the present routine is supplied to the camera signal processing circuit 103 to enable the camera signal processing circuit 103 to vertically and horizontally shift the cut-out area in the entire area of image pickup pixels in the memory, not shown, of the HPF 109, as described hereinbefore, thereby enabling electronic correction of an image deflection caused by the shake of the body of the video camera 100.

Figure 3:
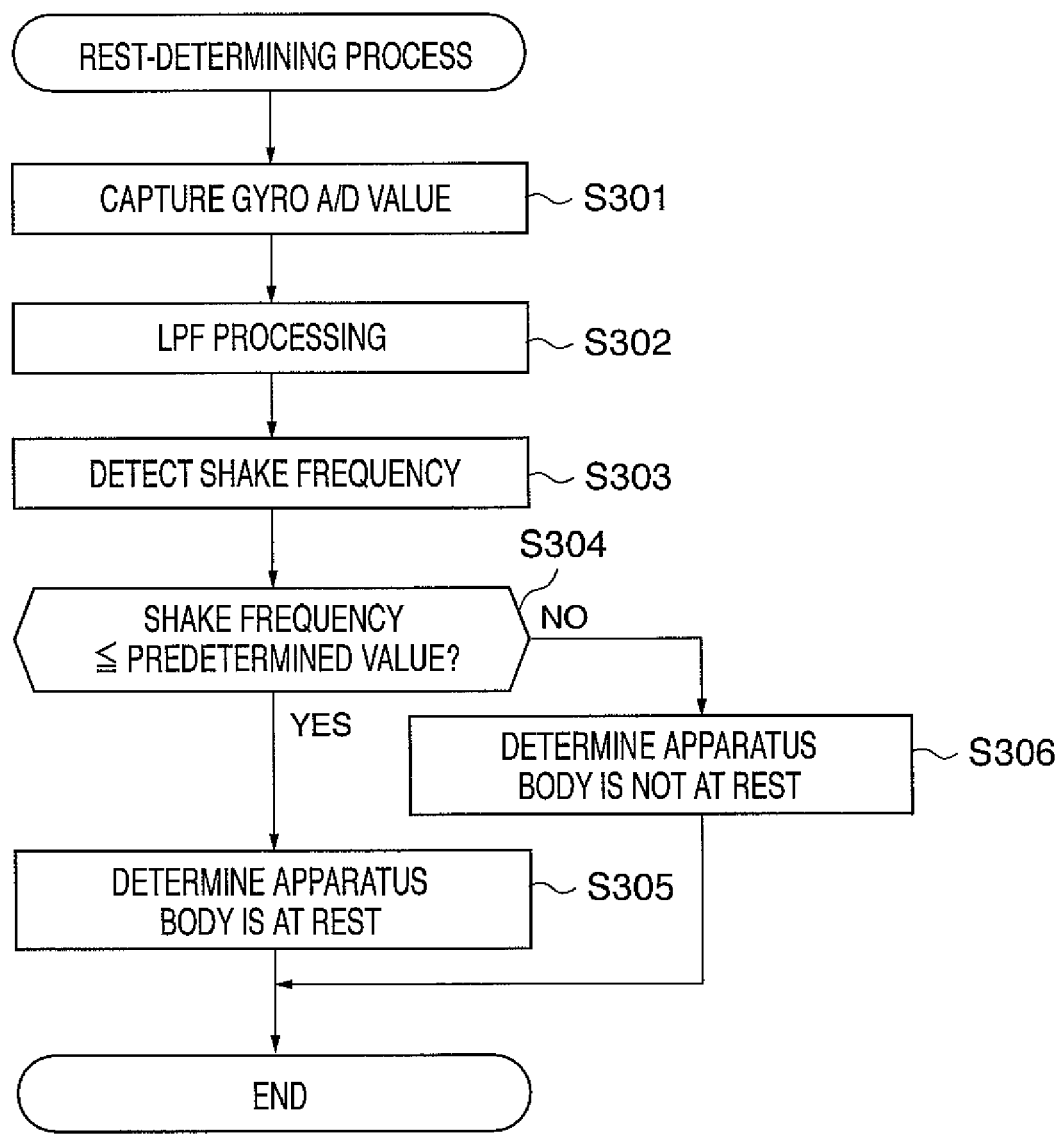
FIG. 3 is a flow diagram of a rest-determining process which is executed in the routine in FIG. 2.

Next, the rest-determining process which is executed in the step S203 in FIG. 2 will be described with reference to FIG. 3. FIG. 3 is a flow diagram of the rest-determining process.

In the present process, first, the digital shake signal output from the A/D converter 108 in the step S201 in FIG. 2 is captured (step S301), and LPF processing is performed on the digital shake signal which is the angular velocity signal digitized by the LFP 112a (step S302). In the LPF processing in the step S302, the captured shake signal is filtered by the LFP 112a, whereby only the shake frequency band is passed through the LFP 112a for extraction.

Now, the LFP 112a will be described in detail. Let it be assumed that the rotational driving frequency of the DVD drive 104a using a DVD as a storage medium is within a range of 28 to 46 Hz. In the video camera 100, the frequency band for shake correction is 1 to 20 Hz, as described above, which is close to the rotational driving frequency of the DVD drive 104a, and hence vibration caused by the rotational driving frequency of the DVD drive 104a can be erroneously detected as a shake to be corrected. The LPF 112a is provided, as a high-order LPF, for elimination of the frequency of a vibration component produced by the rotational driving of the DVD drive 104a of the recorder 104 so as to prevent the erroneous detection. Specifically, if second-order LPFs with the cutoff frequency of the high-order LPF set to 25 Hz are provided in three stages, a gain in the vicinity of 25 Hz is about 0.1 times as large as a gain in the vicinity of the frequency (20 Hz) closest to the rotational driving frequency in the frequency band for correction, so that it is possible to achieve separation of the shake frequency band from the rotational driving frequency band.

Then, a shake frequency in the camera shake frequency band is detected by the frequency-detecting section 112b from the shake signal from which the vibration component caused by the mechanism within the apparatus body is eliminated in the step S302 (step S303), and then by comparing the detected shake frequency with a predetermined frequency, the rest-determining section 112c determines whether the detected shake frequency is not higher than the predetermined frequency (step S304).

If the shake frequency is not higher than the predetermined frequency, it is determined that the body of the video camera 100 is at rest, and the result of the determination is output to the cutoff frequency-setting device 114 (step S305), followed by terminating the present process. On the other hand, if the shake frequency is higher than the predetermined frequency, it is determined that the body of the video camera 100 is not at rest, and the result of the determination is output to the cutoff frequency-setting device 114 (step S306), followed by terminating the present process.

It should be noted that the predetermined frequency is set to a frequency from which it can be determined that the body of the video camera 100 is at rest. Further, data of the predetermined frequency is stored e.g. in a memory, not shown, in the rest-determining section 112c.

As described above, the rest-determining device 112 is capable of detecting the shake frequency of an actual shake of the body of the video camera 100 without erroneously detecting vibration in the rotational driving frequency band caused by rotation of the recorder 104 (DVD drive 104a), as a camera shake, and determining, based on the detected shake frequency of the actual shake of the body of the video camera 100, whether or not the body of the video camera 100 is at rest.

Figure 4:
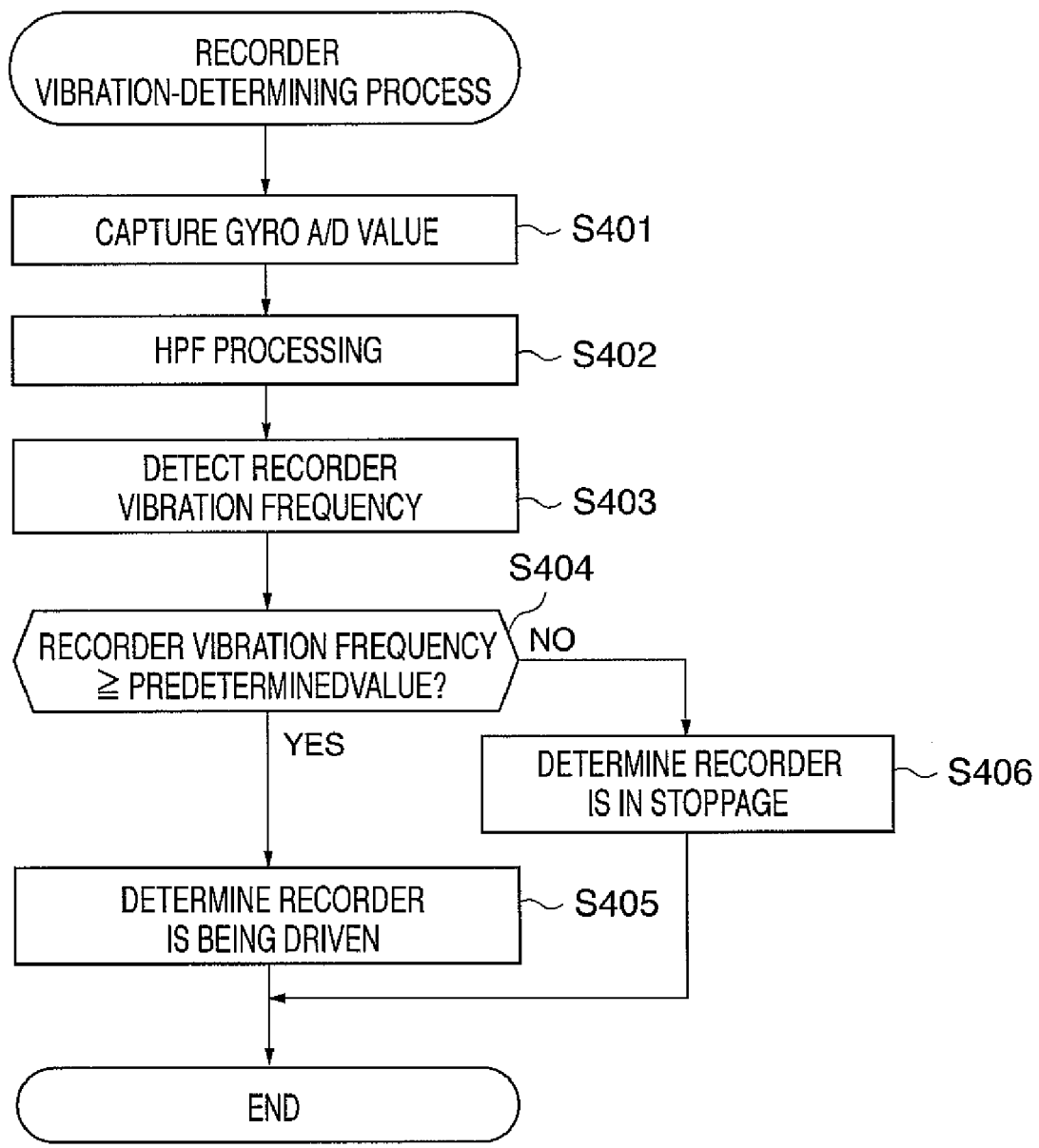
FIG. 4 is a flow diagram of a recorder vibration-determining process which is executed in the routine in FIG. 2.

Next, the recorder vibration-determining process which is executed in the step S204 in FIG. 2 will be described with reference to FIG. 4. FIG. 4 is a flow diagram of the recorder vibration-determining process.

In the present process, first, the digital shake signal output from the A/D converter 108 in the step S201 in FIG. 2 is captured (step S401), and the HPF processing is performed to thereby extract the rotational driving frequency band corresponding to the rotation of the recorder 104, from the captured shake signal (step S402). The HPF 113a is configured to pass therethrough the rotational driving frequency band, and the HPF processing in the step S402 is executed by passing the shake signal captured in the step S401 through the HFP 113a.

Now, the HFP 113a will be described in detail. Let it be assumed that the rotational driving frequency of the DVD drive 104a using a DVD as the storage medium is within the range of 28 to 46 Hz as mentioned above. Whether the DVD drive 104a is being driven can be determined only if the rotational driving frequency band corresponding to the rotation of the DVD drive 104a can be extracted, and therefore the passband of the HFP 113a is set e.g. to a range of not lower than 25 Hz. Although in the present embodiment, the recorder vibration-determining device 113 uses the HFP 113a to extract the rotational driving frequency band corresponding to the rotation of the recorder 104, the recorder vibration-determining device 113 may be provided with a BPF (Band Path Filter) in place of the HFP 113a.

Then, the frequency-detecting section 113b detects the rotational driving frequency (vibration frequency) of rotation of the recorder 104 from the rotational driving frequency band of the shake signal corresponding to the vibration of the mechanism within the apparatus body extracted in the step S402 (step S403). Then, by comparing the detected vibration frequency with a predetermined frequency, the recorder vibration-determining section 113c determines whether the detected vibration frequency is not lower than the predetermined frequency (step S404).

If the vibration frequency detected in the step S403 is not lower than the predetermined frequency, it is determined that the recorder 104 is being driven, and the result of the determination is output to the cutoff frequency-setting device 114 (step S405), followed by terminating the present process. On the other hand, if the vibration frequency is lower than the predetermined frequency, it is determined that the recorder 104 is not being driven, i.e. it is in stoppage, and the result of the determination is output to the cutoff frequency-setting device 114 (step S406), followed by terminating the present process.

It should be noted that the predetermined frequency is set to a frequency from which it can be determined that the recorder 104 is in stoppage. Further, data of the predetermined frequency is stored e.g. in a memory, not shown, in the recorder vibration-determining section 113c.

As described above, the recorder vibration-determining device 113 is capable of detecting the vibration of the recorder 104 in the rotational frequency band, and determining, based on the detected vibration of the recorder 104 in the rotational frequency band, whether or not the recorder 104 is in the driven state.

Figure 5:
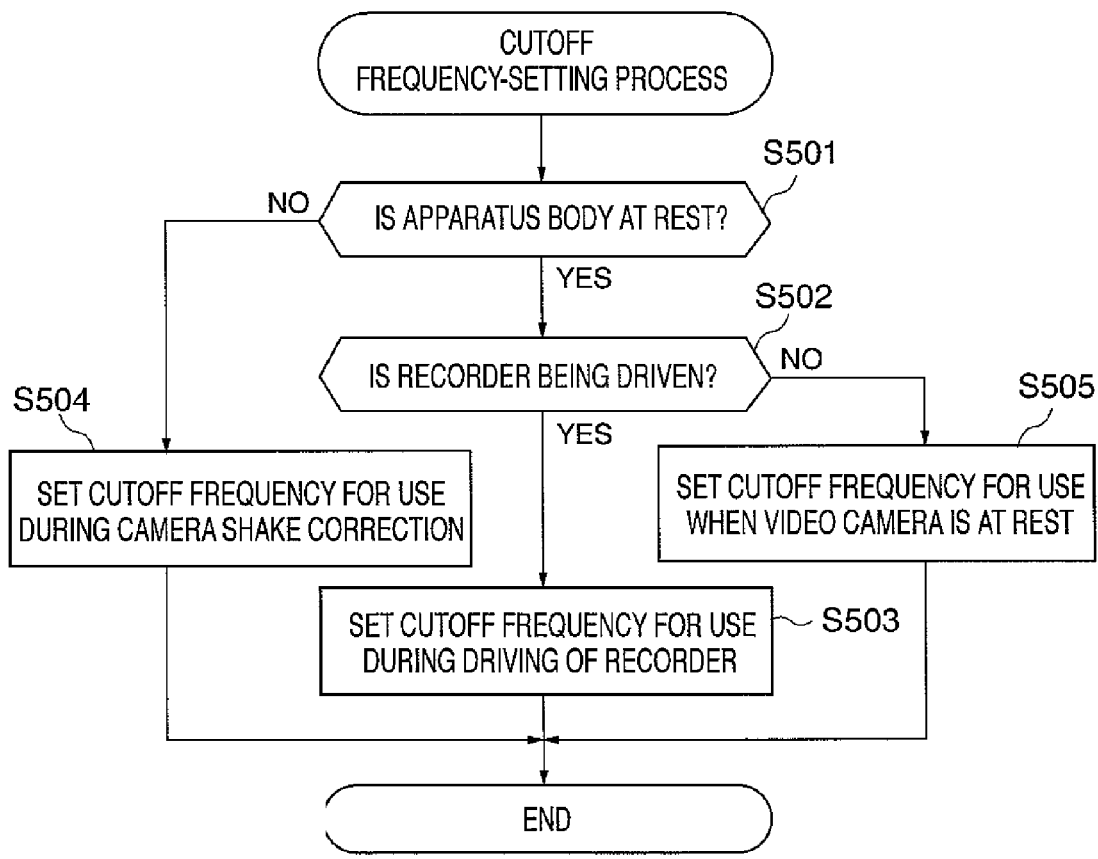
FIG. 5 is a flow diagram of a cutoff frequency-setting process which is executed in the routine in FIG. 2.

Next, the cutoff frequency-setting process executed in the step S205 in FIG. 2 will be described with reference to FIG. 5. FIG. 5 is a flow diagram of the cutoff frequency-setting process.

The cutoff frequency-setting device 114 sets the cutoff frequency of the variable HPF 110 based on the result of the determination by the rest-determining device 112 (step S305 or S306) and the result of the determination by the recorder vibration-determining device 113 (step S405 or S406).

In the present process, first, it is determined whether or not the rest-determining device 112 has determined that the body of the video camera 100 is at rest (step S501). If the body of the video camera 100 is not at rest, which means that the photographer is performing a shooting operation with the video camera 100 in hand, the process proceeds to a step S504 so as to enable the shake correction. In the step S504, the cutoff frequency of the variable HPF 110 is set to a normal cutoff frequency for use during camera shake correction control, followed by terminating the present process. On the other hand, if it is determined in the step S501 that the body of the video camera 100 is at rest, the process proceeds to a step S502.

In the step S502, it is determined whether or not the recorder vibration-determining device 113 has determined that the recorder 104 is being driven. If the recorder 104 is not being driven for rotation, which means that the body of the video camera 100 is rested in a place where there is no vibration and that a recording operation is not being performed, it is not necessary to perform the shake correction, and hence the process proceeds to a step S505, wherein the cutoff frequency of the variable HPF 110 is set to a value for use when the video camera 100 is at rest, followed by terminating the present process. When the body of the video camera 100 is in a state rested in a place where there is no vibration and at the same time no recording operation is being performed, it is not required to carry out the shake correction, and therefore even if the cutoff frequency of the variable HPF 110 is set to a high cutoff frequency of e.g. 200 Hz in the step S505, no problem occurs. By setting the cutoff frequency of the variable HPF 110 to a high cutoff frequency, no signal component for shake correction is allowed to pass through the HPF 110, so that the camera signal processing circuit 103 need not carry out an operation for shifting the cut-out area in the memory, not shown, of the HPF 109.

On the other hand, if it is determined in the step S502 that the recorder 104 is being driven for rotation, which means that the body of the video camera 100 is rested in a place where there is no vibration and that a recording operation is being performed, the cutoff frequency of the variable HPF 110 is set to a value for use during driving of the recorder 104 in a step S503, followed by terminating the present process. Specifically, in the step S503, it is made possible to correct deflection of an image due to vibration of the recorder 104 caused by rotation of the same in a state of the image being free of a fluctuation or the like which can be caused by low frequency components of the output signal from the shake-detecting sensor 105. For example, the cutoff frequency of the variable HPF 110 is set to a cutoff frequency of about 25 Hz. This makes it possible to correct an image deflection caused by frequency components generated by vibration of the recorder 104 due to rotation of the same, while eliminating low frequency components, and hence reduce the amount of deflection of the picked-up image caused by the rotation of the recorder 104 in a fixed state of the body of the video camera 100.

As described above, according to the video camera 100 of the present embodiment, insofar as it is determined that the body of the video camera 100 is at rest in a state fixedly mounted on a tripod or the like, and at the same time it is determined from the rotational driving frequency of the recorder 104 that the recorder 104 is being driven, an image deflection due to the vibration of the recorder 104 caused by rotation of the same is corrected. Therefore, it is possible to reduce the amount of image deflection which occurs when vibration of the recorder 104 causes vibration of the body of the video camera 100. Thus, the video camera 100 according to the present embodiment is capable of achieving enhancement of the accuracy of shake correction.

It should be noted that in each of the HPF 109, the variable HPF 110, and the integrator 111, it is required to set a sampling frequency to a relatively high frequency (e.g. 1 [kHz]) so as to enhance the accuracy of shake correction. On the other hand, each of the rest-determining device 112, the recorder vibration-determining device 113, and the cutoff frequency-setting device 114 can execute processing at a relatively long repetition period (e.g. 100 Hz), and further, load on the microcomputer 107 is large particularly when executing processing for the rest-determining device 112 in which is included high-order LPF processing. Therefore, the sampling frequency of this device may be set to a low level so as to reduce the processing load.

Next, a description will be given of an image pickup apparatus according to a second embodiment of the present invention.

Figure 7:
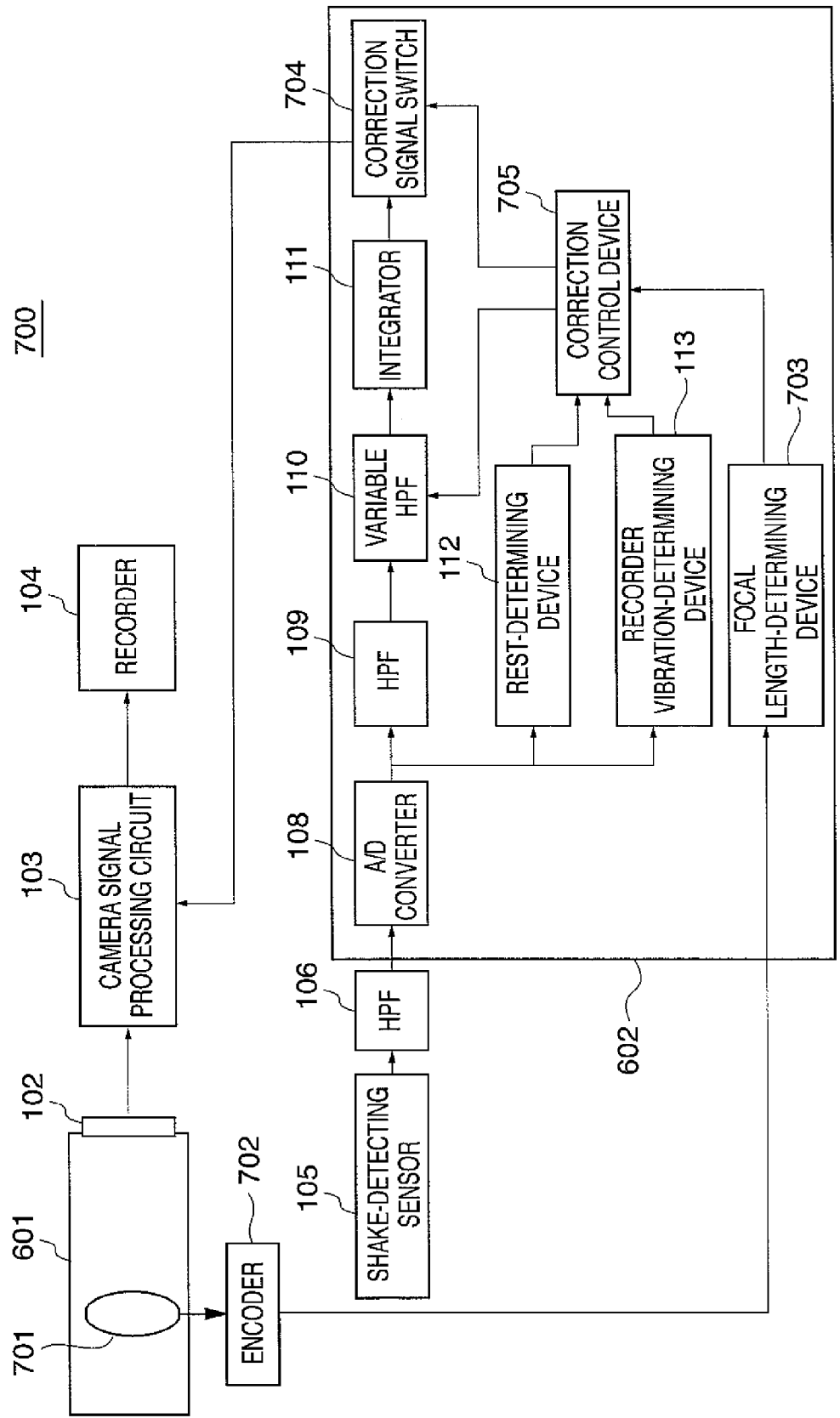
FIG. 7 is a schematic block diagram of a video camera as an image pickup apparatus according to a second embodiment of the present invention.

FIG. 7 is a schematic block diagram of a video camera 700 as the image pickup apparatus according to the second embodiment. The present embodiment is identical to the above-described first embodiment in what is attained, but is different therefrom only in circuit configuration. In the following, components of the present embodiment identical to those of the first embodiment are designated by the same reference numerals, and duplicate description thereof is omitted, but only different points will be described.

Referring to FIG. 7, reference numeral 701 designates a variable power lens (hereinafter referred to as "the zoom lens") which can vary the focal length, 702 an encoder that detects the position of the zoom lens 701, 703 a focal length-determining device that determines a focal length based on an output from the encoder 702, and 704 a correction signal switch that switches an input to the camera signal processing device 103 between an output from the integrator 111 and a central shake correction value, described hereinafter. Further, reference numeral 705 designates a correction control device that sets the cutoff frequency of the variable HPF 110 according to outputs from the rest-determining device 112, the recorder vibration-determining device 113, and the focal length-determining device 703, and at the same time changes the setting of the correction signal switch 704.

As shown in FIG. 7, the video camera 700 is distinguished from the video camera 100 in FIG. 1 in that a lens unit 601 is provided with the zoom lens 701. Further, the video camera 700 is distinguished from the video camera 100 in that a microcomputer 602 includes the focal length-determining device 703, the correction signal switch 704, and the correction control device 705, but not the cutoff frequency-setting device 114.

Figure 8:
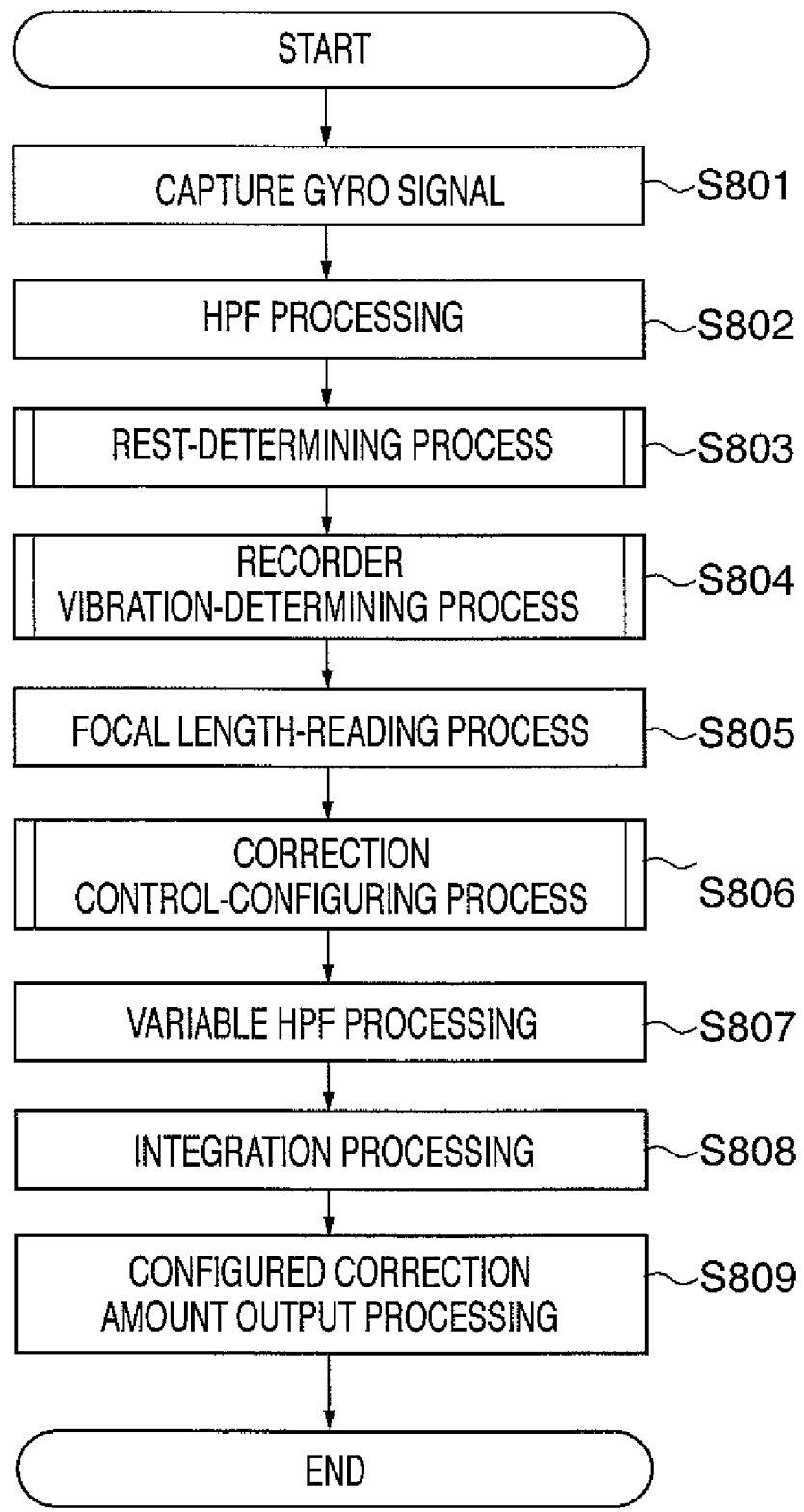
FIG. 8 is a flow diagram of a routine which is executed by a microcomputer appearing in FIG. 7.
Figure 9:
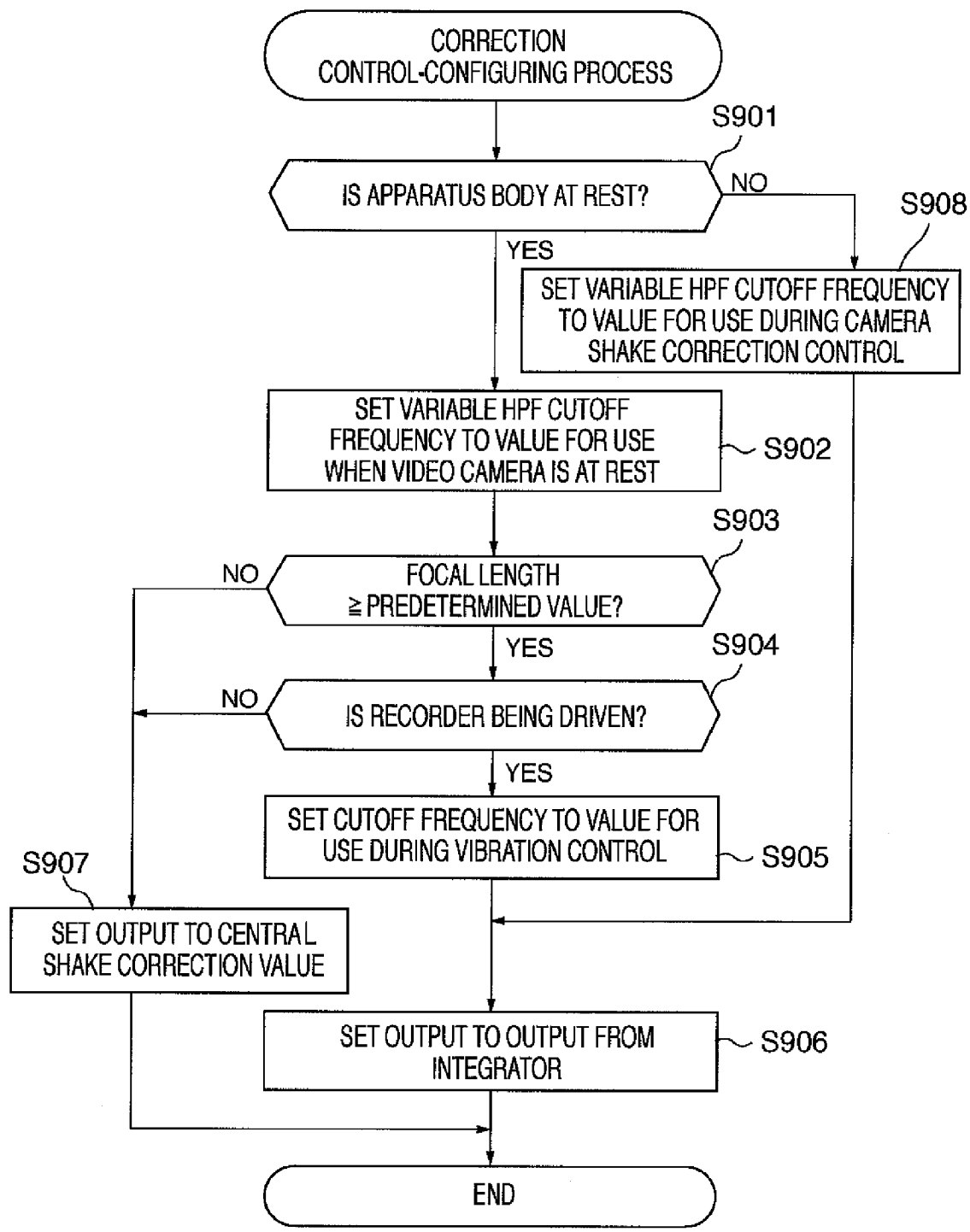
FIG. 9 is a flow diagram of a correction control-configuring process which is executed in the routine in FIG. 8.

Next, the operation of the video camera 700 will be described with reference to FIGS. 8 and 9. FIG. 8 is a flow diagram of a routine which is executed by the microcomputer 602, and FIG. 9 is a flow diagram of a correction control-configuring process which is executed in a step S806 in FIG. 8.

First, the routine which is executed by the microcomputer 602 will be described with reference to the flow diagram in FIG. 8.

In the present routine, first, A/D conversion is carried out by the A/D converter 108 so as to convert an angular velocity signal (analog shake signal) input from the shake-detecting sensor 105 via the HPF 106 into a digital shake signal (step S801). Then, HPF processing is carried out by the HPF 109, whereby DC components generated by the A/D conversion are removed from the A/D converted shake signal (step S802).

Then, a rest-determining process is carried out by the rest-determining device 112 so as to determine whether or not the body of the video camera 700 is at rest (step S803). The rest-determining process in the step S803 is executed, in the same manner as described with respect to the first embodiment (see FIG. 3).

Then, a recorder vibration-determining process is carried out by the recorder vibration-determining device 113 so as to determine whether or not the recorder 104 incorporated in the video camera 700 is being driven (step S804). The recorder vibration-determining process in the step S804 is executed, in the same manner as described with respect to the first embodiment (see FIG. 4).

Then, a focal length-reading process is carried out by the focal length-determining device 703 so as to read focal length information from position information on the zoom lens indicated by an output signal from the encoder 702 (step S805).

Thereafter, the correction control-configuring process is carried out by the correction control device 705 so as to set the cutoff frequency of the variable HPF 110 based on a result of the determination made in the rest-determining process in the step S803, a result of the determination made in the recorder vibration-determining process in the step S804, and the focal length information read in the focal length-reading process in the step S805 (step S806). The correction control-configuring process executed in the step S806 will be described in detail hereinafter.

Then, variable HPF processing is carried out by the variable HPF 110 so as to subject the shake signal output from the HPF 109 in the step S802 to predetermined frequency band limitation according to the cutoff frequency set in the correction control-configuring process in the step S806 (step S807).

Thereafter, integration processing is carried out by the integrator 111 so as to integrate the shake signal having undergone the frequency band limitation in the step S807, thereby calculating an angular displacement signal (step S808).

Then, configured correction amount output processing is carried out by the correction control device 705 and the correction signal switch 704 (step S809), followed by terminating the present routine. In the configured correction amount output processing, the correction control device 705 carries out a changeover of the correction signal switch 704 to output the angular displacement signal calculated in the step S808 or the central shake correction value set during shake correction inhibition, as a target shake correction value, from the microcomputer 602. The changeover of the correction signal switch 704 by the correction control device 705 is executed based on the result of the determination made in the rest-determining process in the step S803, the result of the determination made in the recorder vibration-determining process in the step S804, and the focal length information read in the focal length-reading process in the step S805. It should be noted that when the central shake correction value is output as the target shake correction value, the video camera 700 is placed in the same state as during shake correction inhibition.

The target shake correction value output in the step S809 is supplied to the camera signal processing circuit 103 so as to vertically or horizontally shift a cut-out area in the entire area of image pickup pixels in the memory, not shown, of the HPF 109, as described hereinbefore. Thus, an image deflection caused by a shake of the body of the video camera 700 can be electronically corrected. It should be noted that when the central shake correction value is output as the target shake correction value, the video camera 700 is placed in the same state as during shake correction inhibition, and hence the operation of image deflection correction is not performed.

Figure 10:
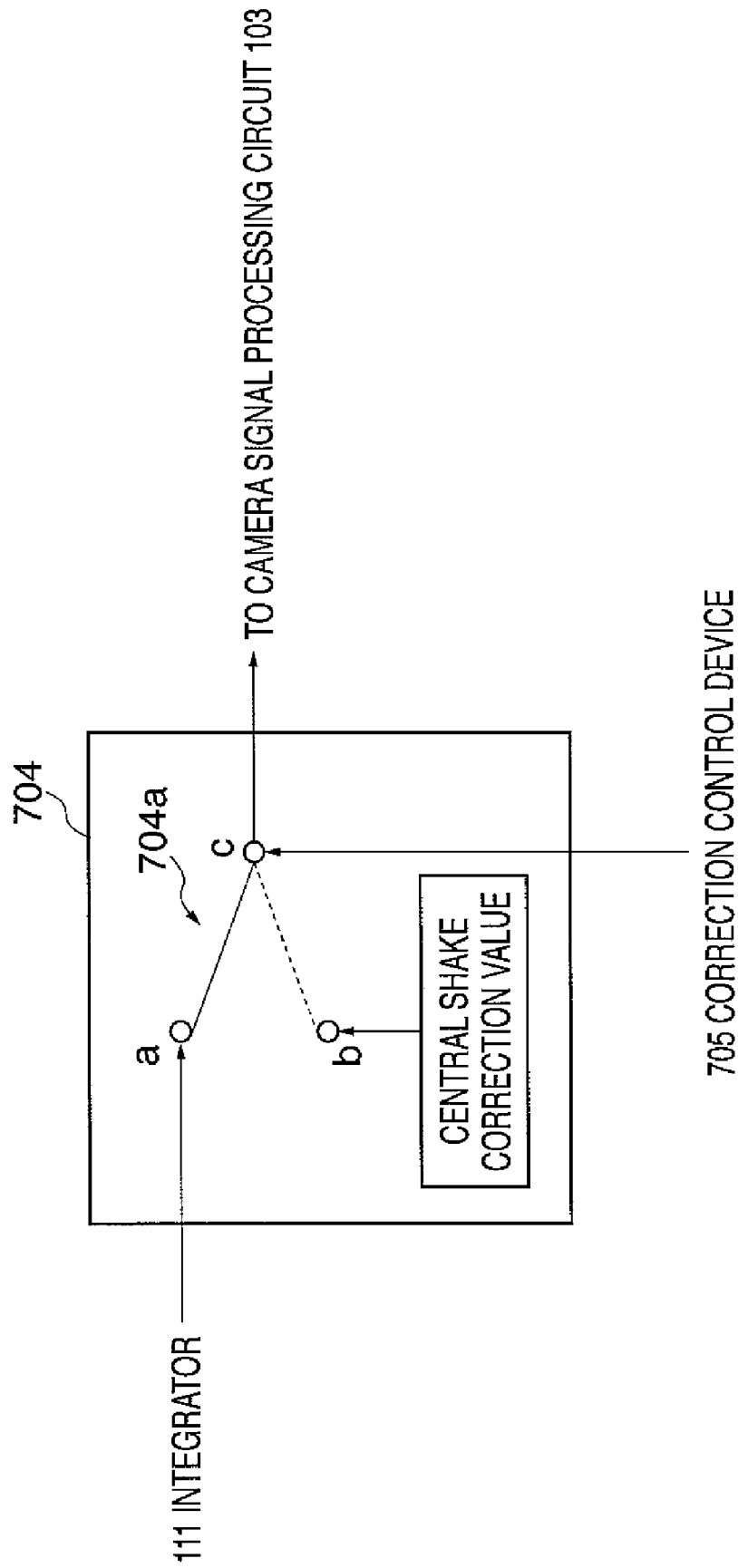
FIG. 10 is a schematic circuit diagram of a correction signal switch appearing in FIG. 7.

Now, the correction signal switch 704 for switching the target shake correction value to be output will be described with reference to FIG. 10. FIG. 10 is a schematic circuit diagram of the correction signal switch 704.

As shown in FIG. 10, the correction signal switch 704 includes a changeover switch 704a having contact points a, b, and c. The contact point a of the changeover switch 704a receives an output from the integrator 111, and the contact point b receives a predetermined target value. The central shake correction value is set to the predetermined target value input to the contact point b. The contact point c is connected to the correction control device 705. The changeover switch 704a is configured to be able to select one of the respective inputs to the contact points a and b, in response to a control signal supplied to the contact point c from the correction control device 705. The input selected by the changeover switch 704a is output as the target shake correction value.

Next, the correction control-configuring process which is executed in the step S806 in FIG. 8 will be described with reference to FIG. 9.

The present process is executed so as to set the cutoff frequency of the variable HPF 110 and carry out a changeover of the correction signal switch 704, based on results of the respective determinations by the rest-determining device 112 and the recorder vibration-determining device 113, and the focal length information read by the focal length-determining device 703.

First, it is determined, based on the result of the determination by the rest-determining device 112 (see FIG. 3), whether or not the body of the video camera 700 is at rest (step S901). If the body of the video camera 700 is not at rest, which means that the photographer is performing a shooting operation with the video camera 700 in hand, the cutoff frequency of the variable HPF 110 is set to a normal cutoff frequency for use during camera shake correction control (step S908), and the process proceeds to a step S906. In the step S906, processing for switching the input of the correction signal switch 704 is executed. If the body of the video camera 700 is not at rest, the correction control device 705 performs, in the step S906, the setting (switching) of the input of the correction signal switch 704 such that the correction signal switch 704 outputs the output from the integrator 111. Then, the present process is terminated.

If it is determined in the step S901 that the body of the video camera 700 is at rest, the cutoff frequency of the variable HPF 110 is set to the value for use when the video camera 100 is at rest (step S902). In the step S902, since the body of the video camera 700 is at rest, which means that shake correction is not required, the cutoff frequency of the variable HPF 110 is set to a high frequency of about 200 Hz so as to filter out low frequency components output from the shake-detecting sensor 105.

Then, it is determined whether the focal length of the lens unit 601 read in the focal length-reading process in the step S805 is not smaller than a predetermined value (step S903). If the focal length is smaller than the predetermined value, the process proceeds to a step S907. Processing in the step S907 is executed so as to switch the input of the correction signal switch 704. When the focal length is smaller than the predetermined value, the input to the correction signal switch 704 is switched from the output from the integrator 111 to the above-mentioned predetermined value (central shake correction value). In this case, the input (target shake correction value) to the correction signal switch 704 is set to the central shake correction value so as to align the optical center of a shake correction means (e.g. the cut-out area in the memory, not shown, of the HPF 109 or the shift lens) with the optical axis. The reason why the optical center of the shake correction means is fixed to the optical axis is that in the case of an apparatus which performs electronic shake correction, if the edges of an area cut out from the entire area of image pickup pixels are located not between pickup pixels, but always on integer pixels (pickup pixels themselves) due to the alignment of the center of the cut-out area with the optical axis (the center of the entire pickup pixels), interpolation is not required, which improves the resolution.

If it is determined in the step S903 that the focal length is not smaller than the predetermined value, it is determined whether or not the recorder 104 incorporated in the body of the video camera 700 is being driven (step S904). If it is determined that the recorder 104 is not being driven, the process proceeds to the step S907, wherein the stop position of the shake correction means is set to the central shake correction value.

If it is determined in the step S904 that the recorder 104 is performing a recording operation, the cutoff frequency of the variable HPF 110 is set to a cutoff frequency which enables correction of vibration caused by rotation of the recorder 104 incorporated within the body of the video camera 700 (step S905). Specifically, low frequency components output from the shake-detecting sensor 105 are filtered out, whereby when the video camera 700 is at rest, with the focal length being closer to the telephoto end (not smaller than the predetermined value) and the recorder 104 being performing a recording operation, an image deflection due to rotational vibration of the recorder 104 is corrected without occurrence of image fluctuation.

As described above, according to the second embodiment of the present invention, in the case where the body of the video camera 100 is fixedly mounted on a tripod or the like, with the focal length being closer to the telephoto end (not smaller than the predetermined value) and the recorder 104 being driven, it is possible to correct an image deflection due to the vibration of the recorder 104 caused by rotation of the same, without carrying out shake correction in the camera shake frequency band (steps S905 and S906). Thus, the amount of image deflection which occurs when vibration of the DVD drive 104a of the recorder 104 causes vibration of the apparatus body can be reduced even during shooting performed at a focal length closer to the telephoto end. Further, in the case where the apparatus body is at rest, with the focal length being smaller than the predetermined value, or in the case where the apparatus body is at rest, with the focal length being not smaller than the predetermined value and with the recorder 104 in stoppage, the shake correction signal is switched to the central shake correction value (step S907) so as to make it possible to prevent degradation of the resolution of a picked-up image. Thus, according to the second embodiment, the accuracy of shake correction can be enhanced.

Further, according to the above-described embodiments, it is possible to solve the problem of increased complexities of mechanisms and exterior design of the video camera without impairing the degree of freedom of designing the frame structure of the video camera and the exterior of the same, as well as to reduce the size and weight of the video camera.

It is to be understood that the present invention is not limited to the above-described first and second embodiments, and can be practiced in various forms without departing from the spirit and scope thereof.

This application claims the benefit of Japanese Application No. 2006-042930, filed Feb. 20, 2006, which is hereby incorporated by reference herein in its entirety.

What is claimed is:

1. An image pickup apparatus comprising:
   an image pickup unit configured to pick up an image;
   a recorder configured to record the image picked-up by the image pickup unit, the recorder generating vibrations when activated;
   a shake-detecting unit configured to detect shaking of the image pickup apparatus;
   a high pass filter configured to have a variable cut-off frequency;
   a first filter configured to receive an output of the shake-detecting unit and having a cut-off frequency set to filter out the vibration induced by the recorder;
   a first determining unit configured to determine, based on an output of the first filter, whether or not the image pickup apparatus is stationary;
   a second filter configured to receive the output of the shake-detecting unit and having a cut-off frequency set to pass therethrough the vibration induced by the recorder;
   a second determining unit configured to determine, based on an output of the second filter, whether or not the recorder is activated;
   a characteristic-changing unit configured to change characteristics of the high pass filter based on a result of determination made by the first determining unit and a result of determination made by the second determining unit; and
   a correction unit configured to stabilize the picked-up image due to the shake based on an output from the high pass filter, the characteristics of which are changed by the characteristic-changing unit depending on the determination made by the first and second determining units.

2. The image pickup apparatus according to claim 1, wherein the characteristic-changing unit changes the cut-off frequency of the high pass filter based on the determination made by the first and second determining units.

3. The image pickup apparatus according to claim 1, wherein the characteristic-changing unit sets the cut-off frequency of the high pass filter to stabilize the vibration induced by the recorder when the recorder is activated, when the first determining unit determines that the image pickup apparatus is stationary and the second determining unit determines that the recorder is activated.

4. The image pickup apparatus according to claim 1, wherein the first determining unit determines, based on a frequency output form the first filter, whether or not the image pickup apparatus is stationary, and the second determining unit determines, based on the frequency from the output of the second filter, whether or not the recorder is activated.

5. The image pickup apparatus according to claim 1, wherein the image pickup unit has an imaging area larger than an image size of the picked-up image to be output, and the correction unit selects an image read range from an entire range of pixels of the image area.

6. The image pickup apparatus according to claim 5, wherein the correction unit stabilizes the image on the imaging area by optically deflecting an optical axis of the image pickup apparatus.

7. The image pickup apparatus according to claim 1, wherein at least one of the first or second determining unit has a longer repetition period than that of the variable high pass filter.

8. The image pickup apparatus according to claim 1, further comprising:
   a zoom lens that varies a focal length; and
   a focal length-detecting unit configured to detect the focal length of the zoom lens,
   wherein the characteristic-changing unit changes the characteristic of the high pass filter based on the determination made by the first and second determining units and the detected focal length of the zoom lens.

9. The image pickup apparatus according to claim 8, wherein the characteristic-changing unit sets the cut-off frequency of the high pass filter to stabilize the vibration induced by the recorder when the recorder is activated, when the first determining unit determines that the image pickup apparatus is stationary, the second determining unit determines that the recorder is activated, and the detected focal length of the zoom lens is longer than a predetermined value.

* * * * *